Patented Feb. 25, 1930

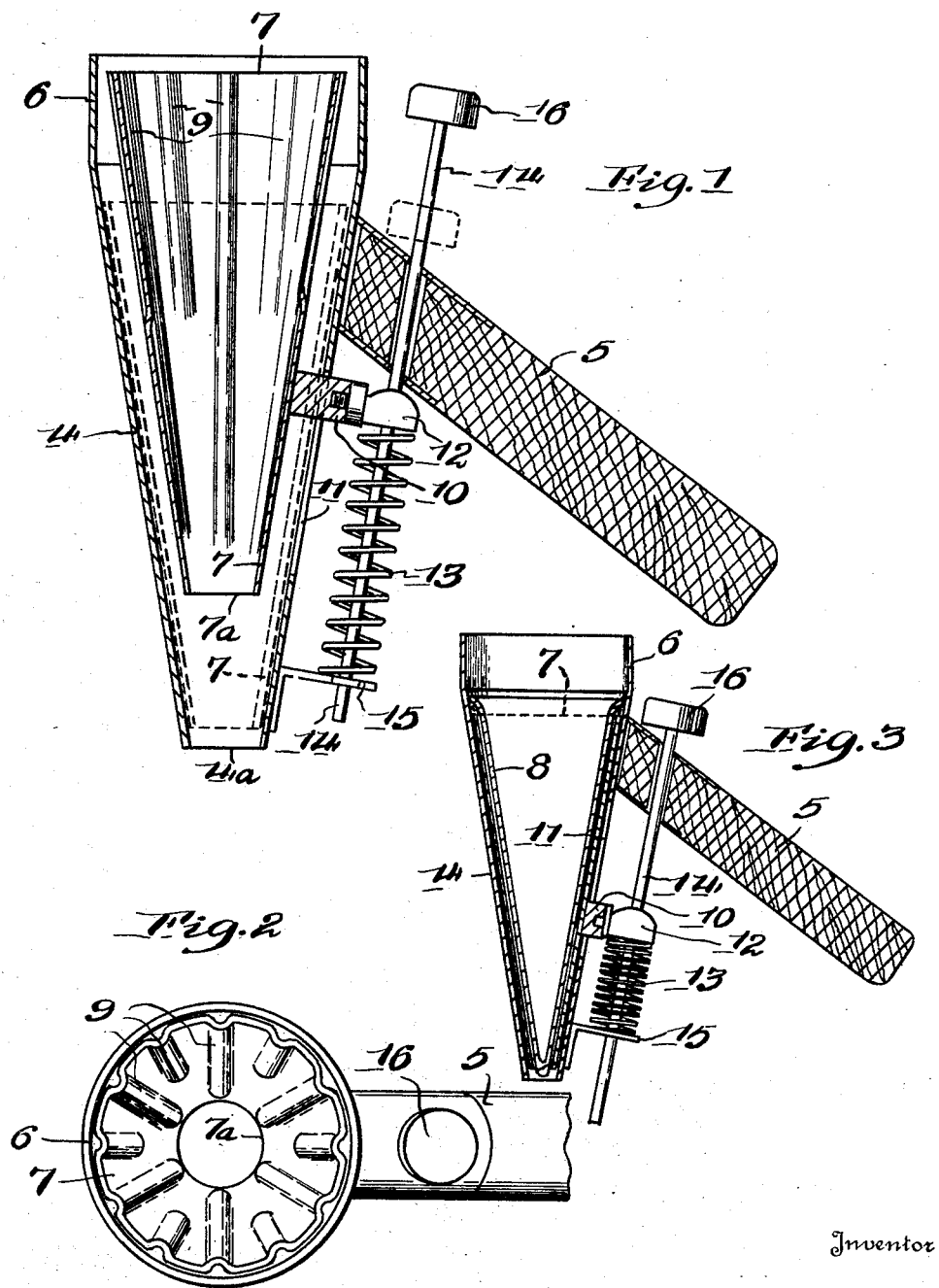

1,748,204

UNITED STATES PATENT OFFICE

CHARLES W. CAMBELL, OF ST. PAUL, MINNESOTA

ICE-CREAM-CONE HOLDER

Application filed October 5, 1927, Serial No. 224,130. Renewed January 9, 1930.

This invention relates to improvements in ice cream dispensing devices of the type described in my co-pending patent application No. 154,924, filed December 15, 1926.

It is my object to facilitate the dispensing of ice cream in edible cones of common type by providing a holder for such cones adapted to be manipulated to forcibly scoop a predetermined quantity of ice cream into the cone from a bulk mass and without danger of breaking the cone.

A further object is to reduce the area of the cone holder in contact with the cone as far as possible consistent with the support required and thus prevent objectionable moistening of the cone by the holder when the latter is wet.

Other objects are to promote economy and facilitate the dispensing of uniform amounts of ice cream by so forming the upper part of the device that it constitutes a gauge for the amount allowed to project above the cone.

The invention will be best understood by reference to the accompanying drawings in which Figure 1 is a central vertical section through my device with the cone engaging member elevated; Fig. 2 is a plan view of the device with a portion of the handle broken away and Fig. 3 is a central vertical section on a somewhat smaller scale, showing an edible cone in place in the holder and depressed within the same as for filling.

My device has a conical outer casing 4 to which is rigidly secured a handle 5 extending obliquely downward from a side of the casing 4. Formed upon the normally upper edge of the casing 4 is a cylindrical extension or gauge 6. This gauge is open at the top and communicates at its bottom with the top of the casing 4. Movable longitudinally within the casing 4 and gauge 6 is a cone support 7 adapted to receive and fit the exterior of an edible cone 8 (Fig. 3) of common type. As shown in Fig. 3 this support 7 extends substantially the entire length of the cone 8 so as to support the same near its large or open end. A series of inwardly offset ribs 9 are formed in the holder 7 to engage the cone 8 and at the same time reduce the surface of the holder in contact with the cone. As shown in Figs. 1 and 2 these ribs 9 preferably extend longitudinally in the holder 7, certain of them being shorter than others and extending only upon the upper part of the holder so as to increase the supporting surface upon the part of the cone where the forces tending to break the same are greatest during the filling operation. The normally lower ends of the casing 4 and the support 7 have openings 4$^a$ and 7$^a$ respectively therein to permit the escape of water from these members of the holder when in use.

For extending and retracting the cone holder 7 within the casing 4 I provide a stud 10 which is rigidly attached at its inner end to the cone support 7 and projects out through a slot 11 formed in the casing 4. At its outer end the stud 10 has a head 12 forming an abutment for a coiled spring 13. The head 12 is fast upon an operating rod 14 which is movable longitudinally through the axis of the spring 13 and has a bearing in the handle 5 and another bearing 15 for its lower end. The bearing 15 is rigidly supported upon the casing 4 near the lower end of said casing. A head 16 upon the upper extremity of the rod 14 is provided to facilitate downward manipulation of said rod with the thumb of the operator.

In use a cone 8 to be filled with ice cream is dropped into the support 7 and then the operator, grasping the handle 5, depresses the head 16 with his thumb so as to retract the cone 8 and support 7 within the casing 4 as shown in Fig. 3. With the parts in this depressed or retracted position ice cream may be forcibly scooped into the cone until the gauge 6 is filled solidly. Any ice cream which projects above the gauge may be quickly and easily removed by merely scraping the upper periphery of the gauge 6 across the edge of the freezer or bulk container. Thus a predetermined and accurately measured amount of ice cream is allowed to project above the cone 8. Now the head 16 of the rod 14 is released and the spring 13 raises or extends the support 7 to its position shown in Fig. 1 where the upper edge of the cone may be readily grasped and the cone removed with its contents.

The cylindrical member 6 upon the top of the casing 4 in addition to constituting a gauge for the ice cream which is allowed to project from the cone also assists in insuring against breakage of the upper edge of the cone. Thus it will be seen that as the ice cream is scooped into the gauge and forced into the top of the cone 8 the amount allowed to enter is restricted by the gauge to a mass the diameter of which is not substantially greater than the diameter of the cone at the top and this mass is directed longitudinally relative to the axis of the cone. Thus it has been found in practical use that the lateral pressure upon the relatively frail cone 8 is reduced sufficiently to insure against breakage even where a solidly frozen product is being dispensed. This is an important feature of my invention in view of the increasing use of artificial refrigeration to preserve ice cream whereby the product is always retained in solidly frozen condition.

The ribs 9 formed in the cone support 7 are provided to adapt the device to the common practice of dipping dispensing devices or scoops into water after each use. As is well known the operators usually dip their scoops into water to remove adhering solidly frozen particles of ice cream and facilitate subsequent filling. By reducing the area of the cone support in contact with the cone to a minimum I avoid injurious moistening of the cone 8 which would otherwise result from this practice. It will further be noted that water is allowed to quickly drain from the walls of the cone support 7 and the casing 4 through the openings 7ª and 4ª. By the oblique arrangement of the handle 5 the scooping operation is facilitated and the sanitary dispensing is insured because the hand of the operator is thus removed from the bulk mass into which the scoop is inserted. This arrangement of handle also prevents the thumb of the operator upon the head 16 from interfering with the removal of the projecting portions from above the gauge 6.

Having described my invention, what I claim as new and desire to protect by Letters Patent is:

1. In an ice cream cone holder a conical casing, a handle rigidly secured to said casing, a cone support movable longitudinally within said casing, said support being adapted to be extended in spaced relation to the inner surface of said casing and to be retracted into contact therewith, means for extending and retracting said support and a series of ribs offset inward upon said support to engage a cone therein.

2. In an ice cream cone holder a conical casing, a handle rigidly secured to said casing, a cone support movable longitudinally within said casing and formed to engage and fit the exterior of a cone near its upper periphery, said support being adapted to be extended in spaced relation to the inner surface of said casing and to be retracted into contact therewith, means for extending and retracting said support and a series of ribs offset inward upon said support to engage a cone therewith and to reduce the area of said support in contact with a cone.

3. In an ice cream cone holder an outer casing, a handle rigidly secured to said casing and projecting obliquely downward therefrom, an extensible and retractile cone support formed to fit the exterior of a cone and movable longitudinally within said casing, a gauge member upon the upper edge of said casing projecting a substantial distance above said support when the latter is retracted, said support being formed to engage the upper portion of a cone held therein and to retain the upper portion of a cone in spaced relation to said casing when retracted therein, a rod operatively connected to said support for extending and retracting the same within said casing, said rod projecting above said handle and a spring arranged to normally extend said support to spaced relation with the inner surface of said casing.

In testimony whereof, I have hereunto signed my name to this specification.

CHARLES W. CAMBELL.